United States Patent
Ivan et al.

(10) Patent No.: US 7,878,218 B2
(45) Date of Patent: Feb. 1, 2011

(54) HIGH VISCOSITY FLUID TRANSFER APPARATUS

(75) Inventors: Catalin Ivan, Houston, TX (US); Daniel Gallo, Katy, TX (US)

(73) Assignee: M-I L.L.C., Houston, TX (US)

( * ) Notice: Subject to any disclaimer, the term of this patent is extended or adjusted under 35 U.S.C. 154(b) by 993 days.

(21) Appl. No.: 11/499,632

(22) Filed: Aug. 4, 2006

(65) Prior Publication Data

US 2007/0028963 A1    Feb. 8, 2007

Related U.S. Application Data

(60) Provisional application No. 60/705,881, filed on Aug. 5, 2005.

(51) Int. Cl.
*B01F 3/00* (2006.01)
(52) U.S. Cl. .................... 137/899; 366/176.1
(58) Field of Classification Search ............. 137/899; 210/194, 525; 366/163.1, 176.1
See application file for complete search history.

(56) References Cited

U.S. PATENT DOCUMENTS

| 4,957,622 | A | 9/1990 | Mims |
| 5,022,995 | A | 6/1991 | Roy et al. |
| 5,846,440 | A | 12/1998 | Angelle |
| 6,056,882 | A | 5/2000 | Scalliet |
| 6,096,228 | A | 8/2000 | Angelle |
| 6,401,829 | B1 * | 6/2002 | Newton ................. 169/24 |
| 6,406,617 | B1 * | 6/2002 | Brauchli ............... 210/122 |
| 6,695,951 | B1 | 2/2004 | Bitterly et al. |

* cited by examiner

*Primary Examiner*—John Fox

(57) ABSTRACT

An apparatus for transferring a viscous fluid including waxy solids includes a mobile platform, a support member having a first end coupled to the platform and a second end, a pump unit coupled to the second end of the support member, wherein the pump unit can be raised and lowered with respect to the second end, wherein the pump unit includes a recirculation system selectively operable to break down waxy solids prior to transfer of the fluid, and an outlet in fluid communication with a collection tank.

14 Claims, 5 Drawing Sheets

HIGH VISCOSITY FLUID TRANSFER APPARATUS

This application claims priority to Provisional Patent Application Ser. No. 60/705,881 filed on Aug. 5, 2005 and entitled, "High Viscosity Fluid Transfer Apparatus" the contents of which are incorporated herein by reference for all purposes.

BACKGROUND OF INVENTION

The term "sludge" is a generic description of an oily waste stream that typically has a high solids content and varying quantities of hydrocarbons and water. Certain sludges, such as those generated in the production of various hydrocarbon products, include vessel sludges, tank bottom sediments and emulsions from water treatment systems. Waste sludge resulting from producing oil and gas wells, for example, is often stored in open pits where it may be left for considerable time before being treated. During such aging periods, the sludge undergoes chemical changes including the effects of weathering and volatilization. It is desirable to treat the sludge to reduce the risk of contamination of the surrounding area and to recover the valuable hydrocarbon component in the sludge.

Mobile pumping units have been developed to transfer sludge. Such units include a mechanical means, such as an auger, for directing sludge towards an opening where suction forces the sludge to a predetermined location. While this method effectively clears sludge from a pit, it does not prepare the sludge fro treatment by breaking down solids that may have accumulated.

Because the sludge is often stored in pits or open tanks, it is necessary to transfer the sludge from the storage or containment area to a treatment area to recover the hydrocarbon component of the sludge. After undergoing the chemical changes brought on by weather and volatilization, the sludge may include oil and fatty acid soaps as well as water and entrained solids. Often, such sludge includes waxy hydrocarbons that must be dissolved before the sludge can be transferred to the treatment area. Thus, it would be desirable to have transfer equipment that can dissolve waxy sludge and transfer the highly viscous fluid to the treatment equipment.

Equipment for treating sludge is becoming more modular and it is beneficial to have a mobile and compact unit that can transfer the viscous sludge to such modular sludge treatment equipment.

SUMMARY

In one aspect, embodiments disclosed herein relate to an apparatus for transferring a viscous fluid, including waxy solids, from a containment area to a treatment or collection area. In other aspects, embodiments disclosed herein relate to a method for preparing a viscous fluid including waxy solids for transfer and transfer thereof.

Embodiments disclosed herein relate to an apparatus for transferring a viscous fluid including waxy solids. The apparatus may include a mobile platform, a support member having a first end coupled to the platform and a second end, a pump unit coupled to the second end of the support member, wherein the pump unit can be raised and lowered with respect to the second end, wherein the pump unit includes a recirculation system selectively operable to break down waxy solids prior to transfer of the fluid, an outlet in fluid communication with a collection tank.

Other embodiments disclosed herein relate to an apparatus for transferring sludge including waxy solids from a containment area. The apparatus may include a mobile platform, a support member having a first end coupled to the platform and a second end, a pump unit coupled to the second end of the support member, wherein the pump unit can be raised and lowered with respect to the second end, and wherein the pump unit may include a recirculation system selectively operable to bread down the waxy solids before transferring the sludge from the containment area, an outlet in fluid communication with a collection tank, and an hydraulic mixing gate imparting turbulence to the sludge when the recirculation system is not in operation.

Other embodiments disclosed herein relate to a method for transferring a viscous fluid from a containment area to a treatment skid, wherein the viscous fluid includes waxy solids and fatty acid soaps. The method may include the steps of positioning a transfer apparatus near the containment area, wherein the transfer apparatus includes a mobile platform to which a first end of a support member is rotatably coupled and a pumping unit including a recirculation system and a pump, the pumping unit coupled to a second end of the support member, fluidly connecting the treatment skid to the pumping unit, selectively positioning the rotatable arm to move the pumping unit over a desired location in the containment area, lowering the pumping unit into the pit such that it is at least partially submerged in the viscous fluid, operating the recirculation system on the pumping unit to break down waxy solids and fatty acid soaps, stopping the recirculation system on the pumping unit, and operating the pump on the pumping unit to transfer sludge to the treatment skid.

Other aspects and advantages of the claimed subject matter will be apparent from the following description and the appended claims.

DETAILED DESCRIPTION

Embodiments of the present disclosure include apparatuses and methods for transferring sludge from a storage area to a treatment unit. More particularly, selected embodiments describe apparatuses and methods for preparing sludge that includes hydrocarbons for transfer and transferring of the prepared sludge to a treatment unit.

Figure 1:
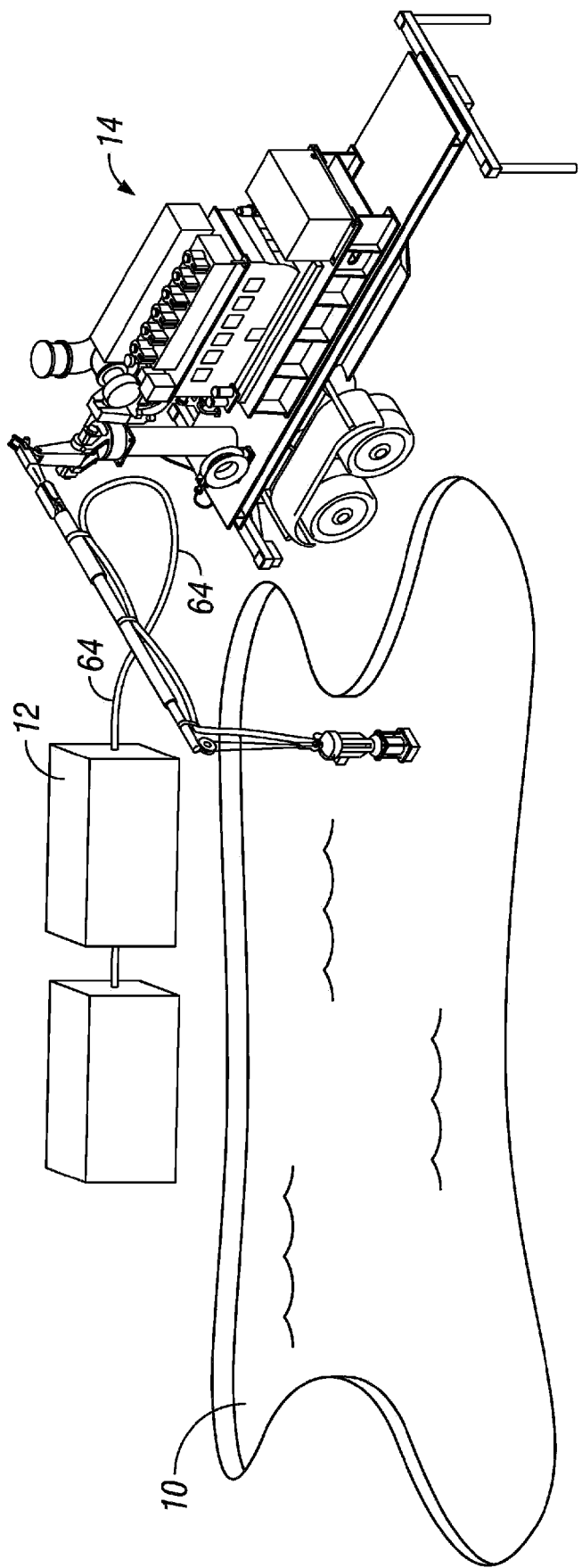
FIG. 1 is a schematic of a sludge pit with treatment equipment and viscous fluid transfer apparatus.

Referring to FIG. 1, a sludge pit 10 is depicted with treatment equipment 12 located adjacent to pit 10. Pit 10 contains sludge 62. A viscous fluid transfer apparatus 14 is selectively located adjacent to pit 10. Viscous fluid transfer apparatus 14 is mobile, thereby permitting its relocation around pit 10 as various areas are depleted. This is particularly useful as pit 10 is emptied and various areas of sludge remain in low areas that may have developed in the bottom of pit 10. Further, transfer apparatus 14 may be relocated to areas within pit 10 after a sufficient quantity of sludge 62 has been removed. It is also anticipated that sludge 62 may be treated and returned to pit 10. In such a case, the mobility of transfer apparatus 14 ensures that various areas of sludge within pit 10 are treated. It will be appreciated by one of skill in the art throughout this discussion that the viscous fluid transfer apparatus 14 described herein could be used in a similar manner if the pit 10 contained any fluid, particularly fluid having a high viscosity. Further, it will be appreciated by one of skill in the art that the viscous fluid transfer apparatus 14 could be used to transfer fluid from one or more containment tanks rather than from an open pit.

Figure 2:
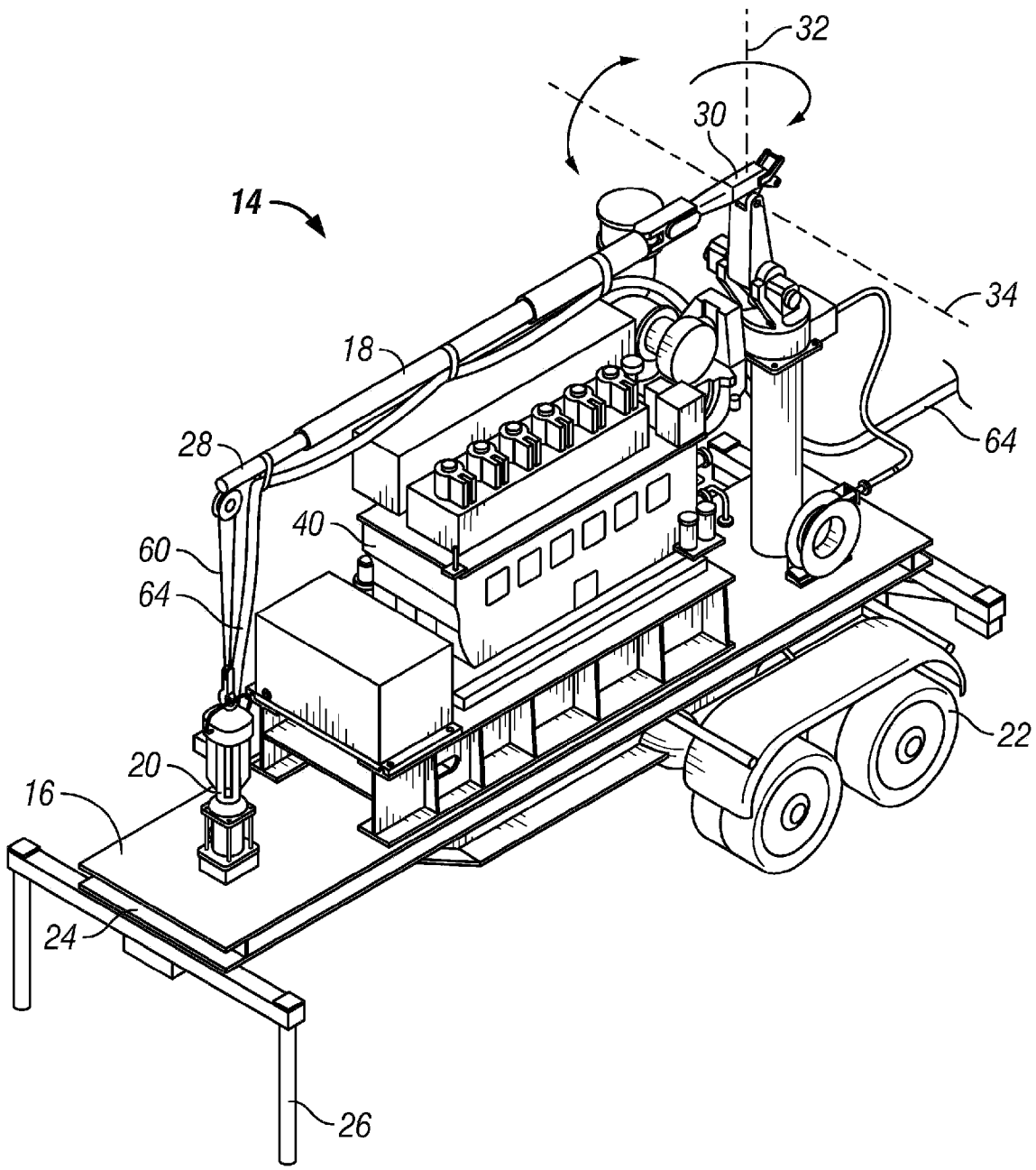
FIG. 2 is a perspective view of a viscous fluid transfer apparatus.

In one embodiment, viscous fluid transfer apparatus 14, shown in FIG. 2, includes a platform 16, a support member 18, and a pump unit 20. The mobility of transfer apparatus 14 is provided by wheels 22 on platform 16. As depicted, wheels 22 are located near a back end of platform 16, while a means for towing 24 apparatus 14 is provided at a front end. Wheels 22 may be provided near a middle portion of platform 16, or located such that a first set of wheels and a second set of wheels are spaced apart along platform 16. One or more support legs 26 are provided to maintain platform 16 in a substantially horizontal position when not being towed.

Pump unit 20 is coupled to a first end 28 of support member 18. Support member 18 is rotationally retained to platform 16 at a second end 30. Preferably, support member 18 is retained such that it may be rotated about a first axis 32 substantially normal to ground. Rotation about first axis 32 may be 360 degrees. It will be appreciated by one of ordinary skill in the art that tolerances and levelness of the ground and platform as well as other factors will affect the actual direction of the first axis 32. Thus, the term "substantially" as used herein in reference to first axis 32 accounts for these variations.

Figure 4:
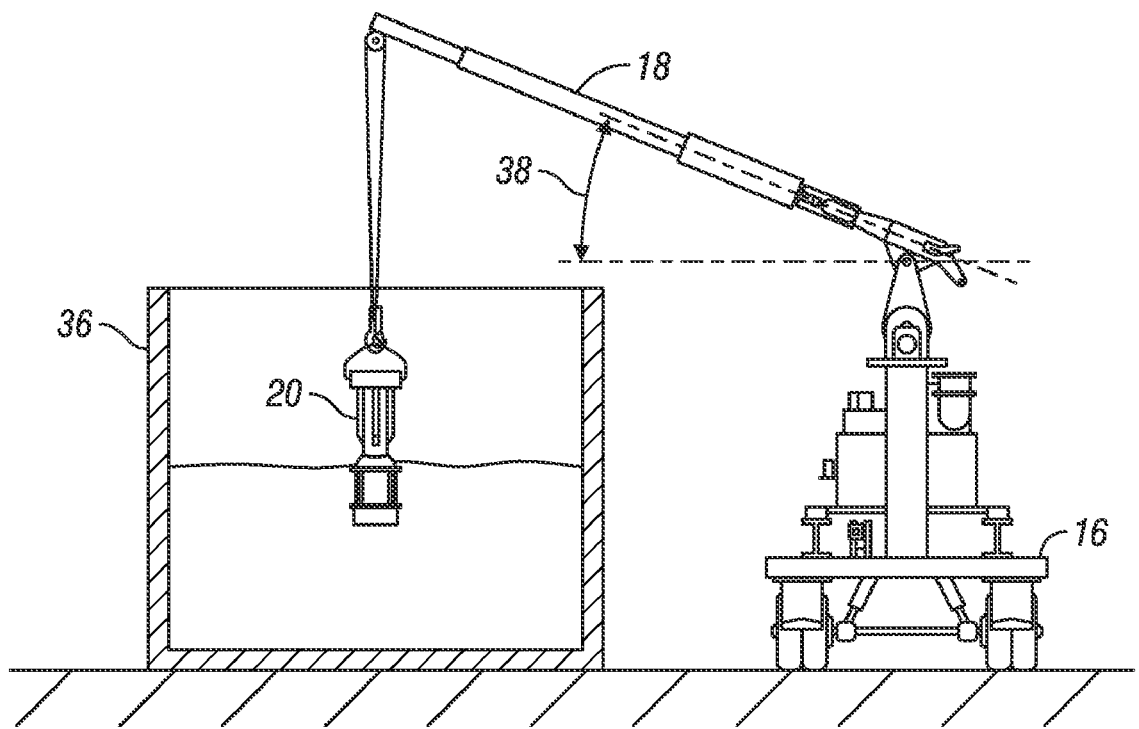
FIG. 4 is front view of viscous transfer apparatus adjacent a holding tank for transfer of fluid therefrom.

Support member 18 may be pivoted about a second axis 34 substantially parallel with ground. Pivoting about second axis 34 permits the first end 28 of support member 18 to be raised and lowered and will be limited by several factors. The location of items on platform 16 will limit the downward rotation of support member 18 when being lowered over platform 16, as depicted in FIG. 2. To prevent contact between pump unit 20 and support member 18, the extent to which rotation of support member 18 raises pump unit 20 may be limited. It is contemplated that rotation about second axis 34 will result in the lowering of support member 18 to an angle less than 10 degrees below parallel with ground. It is further contemplated that rotation about second axis 34 will result in the raising of first end of support member 18 to an angle 38 (shown in FIG. 4) of more than 70 degrees above parallel with ground. It will again be appreciated by one of skill in the art that tolerances and levelness of the ground and platform as well as other factors will affect the actual direction of second axis 32. Thus, the term "substantially" as used herein in reference to second axis 34 accounts for these variations. Further, it will be appreciated that as support member 18 is rotated about first axis 32, the substantially horizontal direction of second axis 34 will rotate as well. In one embodiment, a single linkage, such as ball-and-socket joint provides the capability of raising and lowering first end 28 as well as locating first end 28 circumferentially about platform 16. The manipulation of support member 18 about first and second axes 32 and 34 results in the placement of pump unit 20 at a desired position. Such position may be in a pit 10 or in a holding tank 36, such as depicted in FIG. 4.

In one embodiment, support member 18 is extendable. Support member 18 may include a telescoping arm or coupled linkages that unfold or a combination of both to position first end 28 of support member 18 away from second end 30. By extending support member 18, pump unit 20 can be selectively located over a desired area some distance from the platform 16.

Pump unit 20 should be coupled to support member 18 such that it may be selectively raised or lowered with respect to first end 28. A coupling 60, such as pulleys and cord may be used to raise pump unit 20 with respect to first end 28 such that pump unit 20 may be located on platform 16 during transport of transfer apparatus 14. Coupling 60 between pump unit 20 and first end 28 should permit pump unit 20 to lower to a level below platform 16 sufficient for pump unit 20 to operably reach sludge 62 within pit 10. Likewise, the degree to which support member 18 is rotated about second axis 34 to lift pump unit 20 and the extent to which pump unit 20 may be raised toward first end 28 should be sufficient for pump unit 20 to clear any walls around pit 10 or a holding tank from which sludge is to be removed.

Turning back to FIG. 2, a power system 40 may be provided on platform 16. Power system 40 provides power to pump unit 20. Power system 40 includes a drive system for rotating support member 18 about first axis 32, raising and lowering support member 18, and extending and retracting support member 18. Preferably power system 40 is a self-contained power source, such as a diesel generator. Alternatively, power may be obtained from a source external to viscous fluid transfer apparatus 12. In such an embodiment, the drive system is still included in order to position support member 18 as desired.

Figure 3:
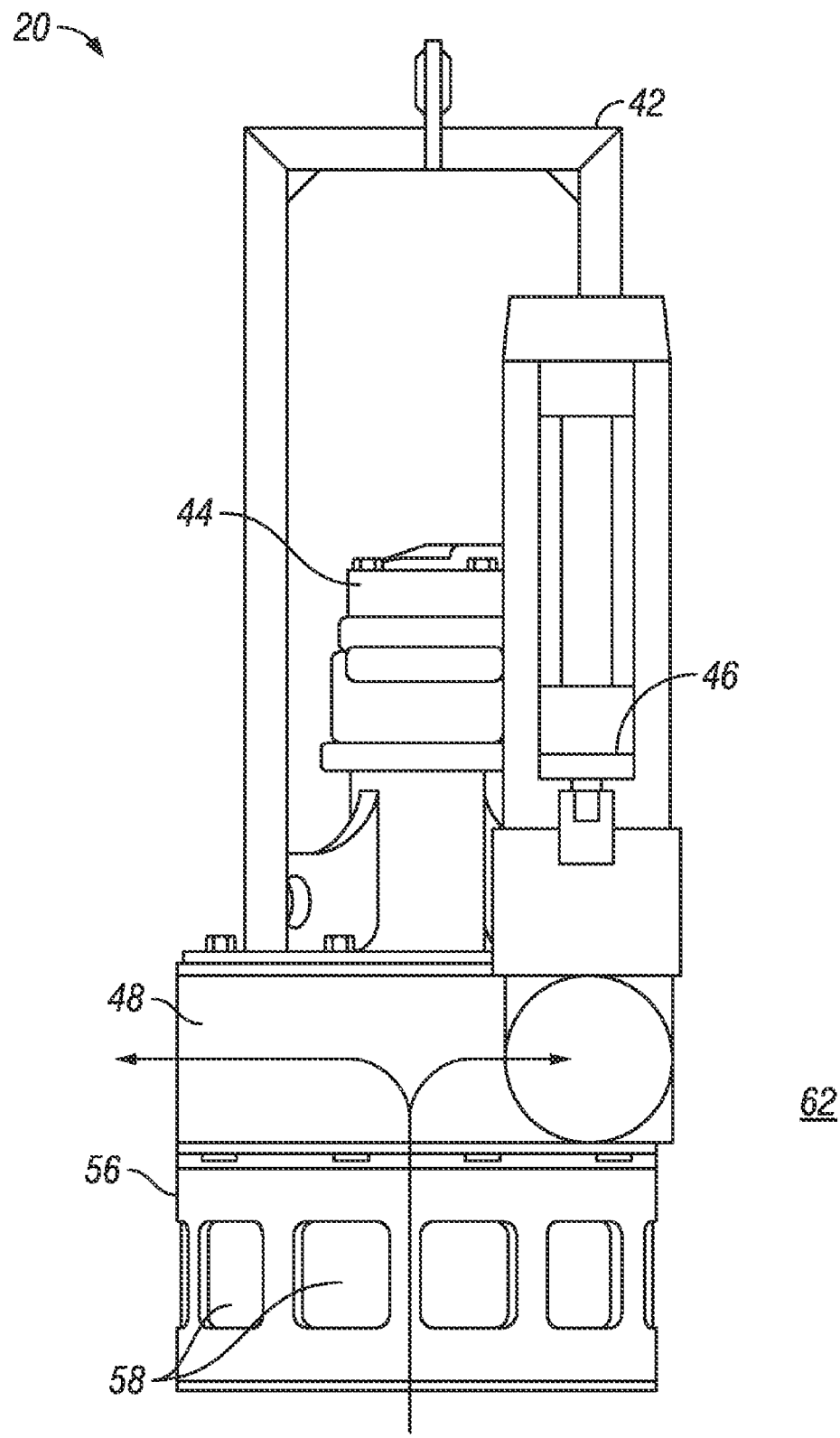
FIG. 3 is a front view of a pump unit of the viscous fluid transfer apparatus.
Figure 5:
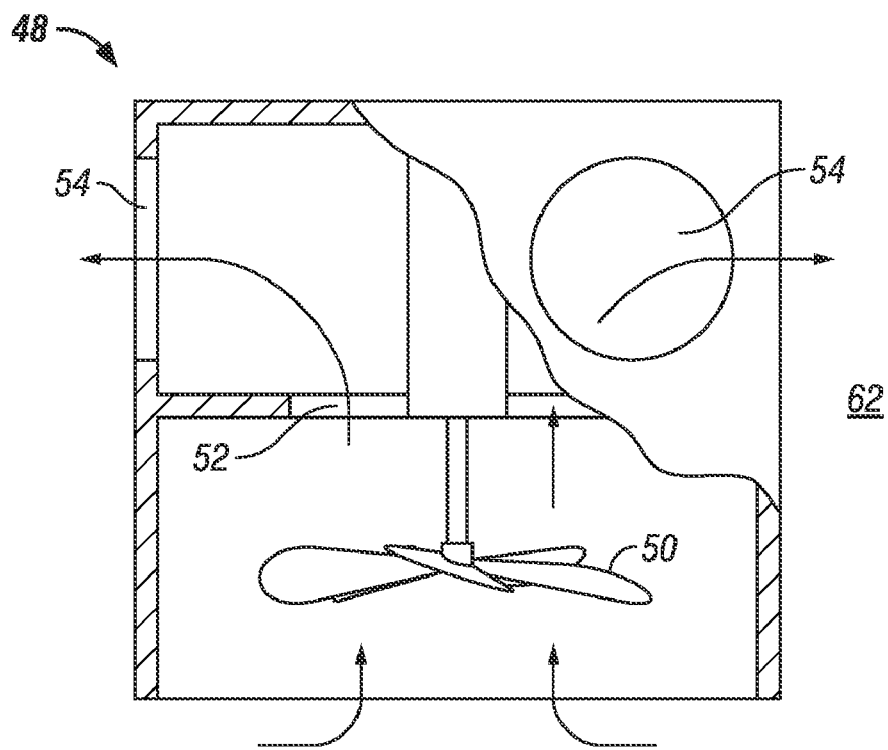
FIG. 5 is a schematic of a recirculation system of a pump unit on a viscous fluid transfer apparatus.

Referring to FIGS. 3 and 5, pump unit 20 is shown. Pump unit 20 includes a lifting bail 42, which is attachable to the coupling mechanism on support member 18 and can support the weight of pump unit 20. Pump unit 20 also includes a recirculation system 48 for breaking down waxes and paraffins. Recirculation system 48 includes an impeller 50, an inlet 52, and at least one outlet 54. For sludges that include waxes or paraffins, dissolving such solids prior to transfer prepares the sludge for treatment. Recirculation system 48 dissolves these solids and helps reduce the viscosity of the surrounding sludge 62 to transfer the fluid more efficiently. During operation of recirculation system 48, impeller 50 is operated by a motor 44 to draw fluid into inlet 52. From inlet 52, the sludge 62 is recirculated through outlet 54 back into the sludge pit or tank. After the solidified sludge material in the area around pump unit 20 is dissolved and the sludge 62 has reached an acceptable viscosity, an access port (not shown) may be opened and operation of the recirculation system 48 temporarily halted. As will be described, the fluidized sludge 62 is then directed through the access port out of the sludge pit 10 or holding tank 36. The determination of whether the sludge has reached an acceptable viscosity can be made based on visual feedback of the way the sludge looks in the vicinity of the pump unit and the visual perception of the performance of the pump unit 20, audible feedback of the way the pump unit sounds, and/or based on sensor data from one or more sensors in or near the pump unit 20 and/or at the containment area.

Continuing to refer to FIG. 3, a basket 56 surrounds impeller 50 (shown in FIG. 5). Basket 56 has plurality of openings 58 through which sludge 62 and any entrained solids are drawn when impeller 50 is in operation. Additional openings on the bottom of pump unit 20 may also be included. Openings 58 are sized to keep large solids from entering the area around impeller 50. Solids of a size larger than that of openings 58 could damage impeller 50 or other upstream equipment, therefore basket 56 acts as a filter to limit the size of solid that can pass into the region of the impeller 50.

A hydraulic mixing gate 46 is in fluid communication with access port (not shown) that is opened after recirculation system 48 has prepared the sludge for transfer. Turbulence is imparted to the fluidized sludge 62 as it passes through hydraulic mixing gate 46. The turbulence further lowers the viscosity of the fluidized sludge 62 and maintains the dissolved solids in a liquid state for transfer to treatment equipment 12. From hydraulic mixing gate 46, fluid is directed through a first line 64 to treatment equipment 12 or a separate storage tank.

Viscous fluid transfer apparatus 14 may include an operator interface terminal 70 from which an operator can control operation of the pump unit 20. Pump unit controls may include controls for the actuation and cessation of the recirculation system, opening and closing of the access port, as well as operation of the pump. Operator controls for positioning the support member 18 may also be included on the operator interface terminal 70. Alternatively operator controls for positioning the support member 18 may be located on a separate device capable of communicating with the support member 18 via wireless signals or through an electronic communication cable of a length sufficient for the operator to move about within a proximity of the viscous fluid transfer apparatus 14 and maintain visual contact with the first end 28 of the support member 18. Such a remote control may also include controls for operation of the pump unit 20.

In operation, viscous fluid transfer apparatus 14 is transported to a location adjacent to a containment area such as a pit 10 or holding tank 36, within which sludge 62 to be transferred for treatment is contained. The sludge 62 to be treated may have a high viscosity and may have accumulated waxy solidified hydrocarbons as well as some solids. Once the transfer apparatus 14 has been positioned in a desired location, first line 64 may be connected to an inlet on treatment equipment 12. The opposite end of first line 64 should be connected to pump unit 20. Thus, pump unit 20 is in fluid communication with treatment equipment 12 through first line 64.

Support member 18 is rotated about first axis 32 to position pump unit 20 circumferentially at a desired location relative to platform 16. Support member 18 is pivoted about second axis 34 to position pump unit 20 at a desired distance from platform 16 and at a desired height relative to the sludge surface. Support member 18 may be extended or shortened to position pump unit 20 in the desired location.

When the pump unit 20 is positioned in the desired location, it is lowered into the pit 10 or tank 36 using support member 18 and coupling 60 between support member 18 and pump unit 20. As previously discussed, coupling 60 should permit the raising and lowering of pump unit 20 with respect to first end 28 of support member 18. The position of support member 18 with respect to platform 16 as well as the position of pump unit 20 with respect to first end 28 may be controlled by an operator control interface (not shown) on the transfer apparatus 14 or remotely. If operating support member 18 and lowering and/or raising pump unit 20 remotely, then communication lines (not shown) from a remote operator interface (not shown) to transfer apparatus 14 may be required. Alternatively, remote operator interface may transmit instructions to support member 18 and coupling 60 wirelessly. Pump unit 20 should be lowered toward the sludge surface until recirculation system 48 is just submerged in the sludge 62.

When recirculation system 48 is submerged in sludge 62, it may be activated by an operator from operator control interface 70 on transfer apparatus 14 or from remote operator interface. Once activated, impeller 50 rotates, thereby imparting turbulence to sludge 62 located in the vicinity of impeller 50. The rotating action of impeller 50 draws sludge 62 upwards and through openings 58 into trash basket 56. Sludge 62 travels through the area around impeller 50, into inlet 52, and out through outlet 54 back to pit 10 or tank 36. Sludge that has solidified to a waxy consistency is dissolved by the action of impeller 50. This operation is continued until the sludge in the vicinity of recirculation system 48 has reached a desired viscosity. Support member 18 and coupling 60 may be used to move pump unit 20 around a portion of the containment area to lower the viscosity of sludge in that area.

After the desired viscosity is reached, recirculation of sludge is halted and the sludge 62 is pumped into hydraulic mixing gate 46. As sludge 62 passes through hydraulic mixing gate 46, turbulence is imparted to the sludge by strategically located weirs or plates therein. This turbulence aids in maintaining sludge 62 at the desired viscosity although use of recirculation system 48 has been temporarily suspended.

First line 64 is in fluid communication with hydraulic mixing gate 46. Sludge 62 exiting hydraulic mixing gate 46 is directed through first line 64 to treatment equipment 12 or other collection tanks.

If the viscosity of sludge 62 increases, transfer of sludge 62 through hydraulic mixing gate 46 and first line 64 may be temporarily ceased and recirculation system 48 may be reactivated. Recirculation system 48 may be operated until the viscosity of sludge 62 is once more lowered to a desired level.

Pump unit 20 may be moved within an area reachable by the combined movement of support member 18 and coupling 60. When desired, transfer apparatus 14 may be moved to another location around pit 10 or to another holding tank 36. This is particularly useful when a pit 10 filled with sludge 62 is being treated to remove certain components and the waste product is being returned to pit 10.

Figure 6:
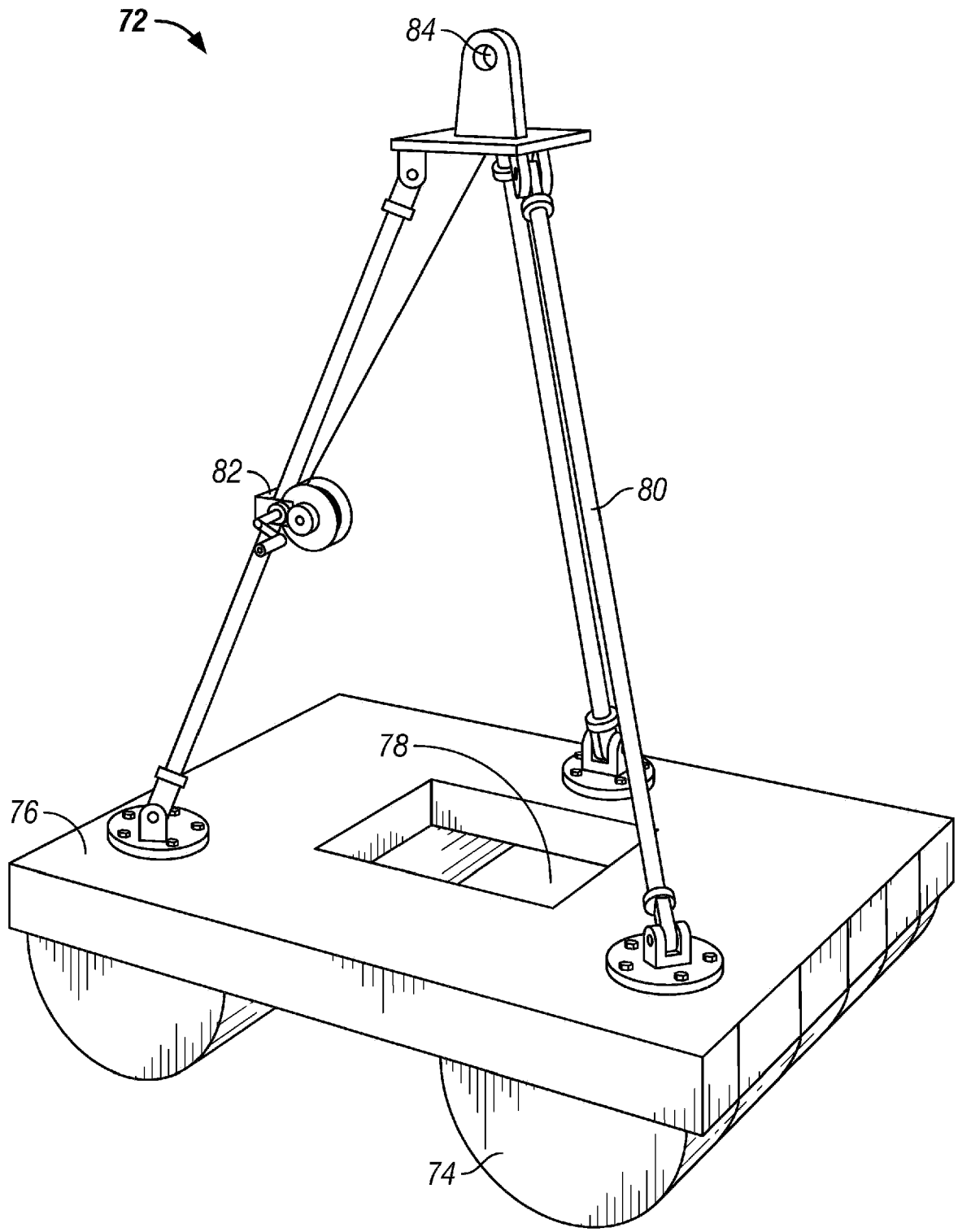
FIG. 6 is a perspective view of a floating platform.

One of skill in the art will appreciate that a large pit 10 may have areas that cannot be reached by the mobile platform 16 in combination with support member 18. To accommodate positioning pump unit 20 towards more central locations within pit 10, a floating platform 72 may be used. Referring to FIG. 6, floating platform 72 includes one or more floats 74 upon which a platform 76 is affixed. A hole 78 is provided through platform 76 through which pump unit 20 may be lowered into the sludge. A support structure 80 is provided on platform 76. Support structure 80 may include an eyelet 84 for hoisting floating platform 72 into and/or out of a pit 10. Pump unit 20 is supported by support structure 80. A winch 82 may be provided to raise and lower pump unit 20. Winch 82 may be manually or remotely operable to raise and lower pump unit 20. First line 64 fluidly connecting pump unit 20 to treatment equipment or another receptacle will need to be of sufficient length to reach from the central locations of the pit 10 in which the floating platform 72 is to be located to the treatment equipment or receptacle to which the fluidized sludge is to be transferred. A power line (not shown) from power system 40 to pump unit 20 must also be of sufficient length to provide power to pump unit 20 when floating platform 72 is centrally located in the pit 10. Further, unless communication of the desired operation of pump unit 20 is wireless, a communication line (not shown) from an operator interface terminal to pump unit 20 must also be of sufficient length to reach pump unit 20 when floating platform 72 is centrally located within pit 10.

When treatment of sludge at a first location is concluded, transfer apparatus 14 is easily transported to a second location. Support member 18 is retracted and a space for pump unit 10 may be provided on platform 16 adjacent power system 40. Pump unit 10 may be secured to platform 16 to prevent its premature departure therefrom during transport. Support member 18 is also secured for transport to prevent rotational movement during transport. Means for towing 24 is used to selectively attach platform 16 to a vehicle (not shown). Support legs 26 may be removed or raised during transport.

While the claimed subject matter has been described with respect to a limited number of embodiments, those skilled in the art, having benefit of this disclosure, will appreciate that other embodiments can be devised which do not depart from the scope of the claimed subject matter as disclosed herein. For example, the viscous fluid transfer apparatus 14 may be used to prepare and transfer any fluid that has a high viscosity that makes it difficult to pump using prior art means. Examples of such fluids may include drilling fluids or slop. Further, the viscous fluid transfer apparatus 14 may be used to move sludges, slurries, or other fluids having a high viscosity to and/or from a tank, holding area, vehicle, or other receptacle having a storage area suitable for containing the fluid. Accordingly, the scope of the claimed subject matter should be limited only by the attached claims.

What is claimed is:

1. An apparatus for transferring a viscous fluid including waxy solids, the apparatus comprising:
    a mobile platform;
    a support member having a first end coupled to the platform and a second end; and
    a pump unit coupled to the second end of the support member, wherein the pump unit can be raised and lowered with respect to the second end; and
    wherein the pump unit comprises:
        a recirculation system selectively operable to break down waxy solids prior to transfer of the fluid;
        a hydraulic mixing gate imparting turbulence to the viscous fluid when the recirculation system is not in operation; and
        an outlet in fluid communication with a collection tank.

2. The apparatus of claim 1 wherein the support member is rotatable about a first axis substantially perpendicular with ground.

3. The apparatus of claim 2 wherein the support member is rotatable about a second axis substantially parallel with ground.

4. The apparatus of claim 3 wherein the support member is extendable.

5. The apparatus of claim 1 wherein the recirculation system includes an impeller for breaking down of waxy solids.

6. The apparatus of claim 1 further comprising:
    an operator interface control including a plurality of operator controls for operating the pump unit.

7. The apparatus of claim 6, wherein the operator interface control further includes controls for positioning the support member.

8. An apparatus for transferring sludge including waxy solids from a containment area, the apparatus comprising:
    a mobile platform;
    a support member having a first end coupled to the platform and a second end;
    a pump unit coupled to the second end of the support member, wherein the pump unit can be raised and lowered with respect to the second end; and
    wherein the pump unit comprises:
        a recirculation system selectively operable to bread down the waxy solids before transferring the sludge from the containment area;
        an outlet in fluid communication with a collection tank; and
        a hydraulic mixing gate imparting turbulence to the sludge when the recirculation system is not in operation.

9. The apparatus of claim 8 wherein the support member is rotatable about a first axis substantially perpendicular with ground.

10. The apparatus of claim 9 wherein the support member is rotatable about a second axis substantially parallel with ground.

11. The apparatus of claim 10 wherein the support member is extendable.

12. The apparatus of claim 8 wherein the recirculation system includes an impeller for breaking down the waxy solids.

13. The apparatus of claim 8 further comprising:
    an operator interface control including a plurality of operator controls for operating the pump unit.

14. The apparatus of claim 13 wherein the operator interface control further includes controls for positioning the support member.

* * * * *